June 6, 1961 L. D. COBB 2,987,154
ONE WAY CLUTCH
Filed Feb. 8, 1954 2 Sheets-Sheet 1
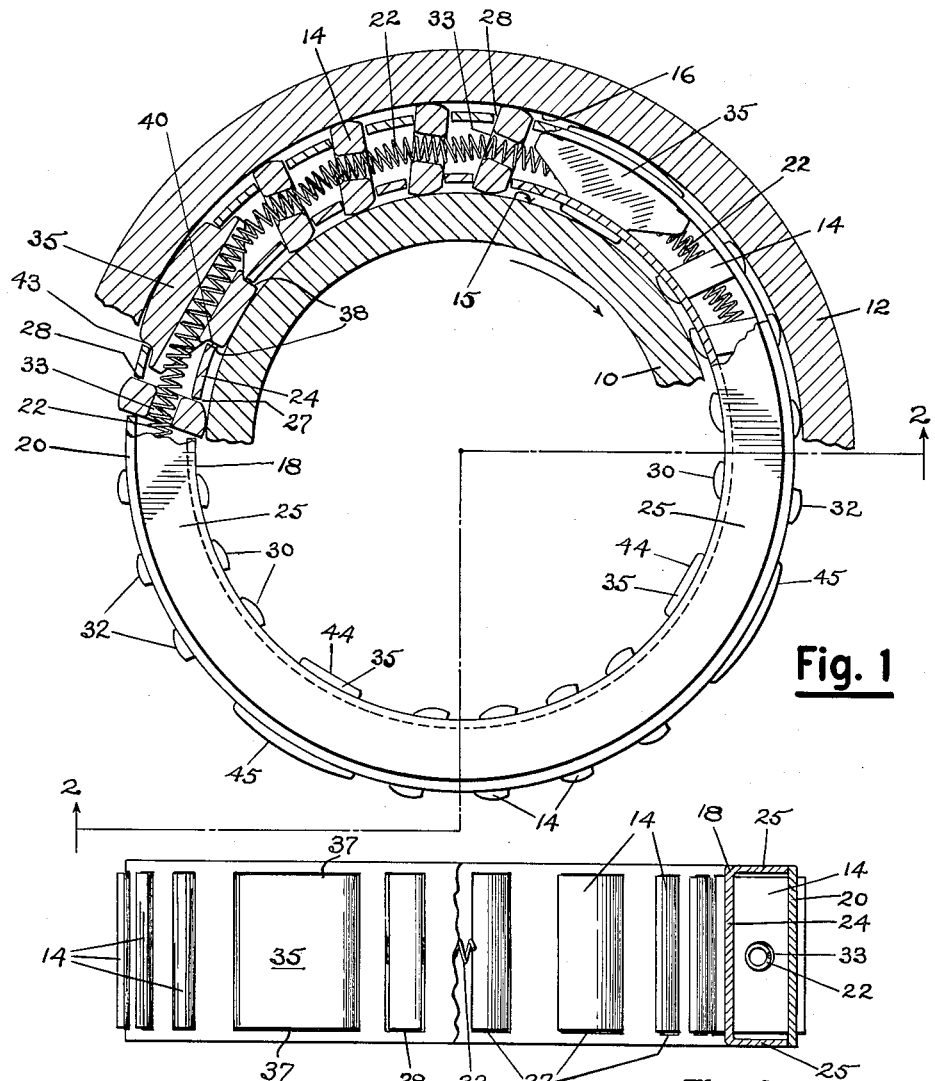
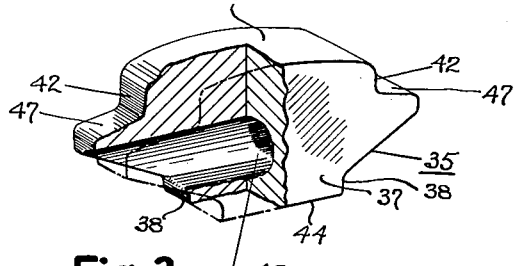
INVENTOR:
LELAND D. COBB
BY Edward H. Goodrich
HIS ATTORNEY.

June 6, 1961  L. D. COBB  2,987,154
ONE WAY CLUTCH
Filed Feb. 8, 1954  2 Sheets-Sheet 2

INVENTOR:
LELAND D. COBB
BY Edward H. Goodrich
HIS ATTORNEY,

United States Patent Office 2,987,154
Patented June 6, 1961

2,987,154
ONE WAY CLUTCH
Leland D. Cobb, Forestville, Conn., assignor to General Motors Corporation, Detroit, Mich., a corporation of Delaware
Filed Feb. 8, 1954, Ser. No. 408,769
13 Claims. (Cl. 192—45.2)

This invention relates to one way clutches and particularly to clutches having tiltable grippers that are guided simultaneously into and out of uni-directional driving relation between a pair of relatively rotatable members.

Tiltable gripper type clutches have heretofore been proposed wherein a series of spring-urged grippers, circumferentially spaced by a cage, have been employed in uni-directional driving connection between a pair of cylindrical surfaces such as concentric inner and outer raceways. However in such an arrangement the cage has been frictionally supported on one of the raceways since a non-coaxial positioning of the cage with respect to the raceways produces non-uniform gripper action causing only a few of the grippers to take full driving load often resulting in clutch failure. This dragging of the cage on a raceway produces objectionable friction and detrimental wear. For satisfactory gripper action it is usually necessary to also have an outboard bearing adjacent to each side of this type of tiltable gripper clutch to locate the raceways in coaxial relation to each other. However, space limitations in many compact mechanisms preclude the use of such outboard bearings so that this type of clutch cannot be used.

It is therefore, an object of this invention to provide for a uni-directional driving connection between a pair of relatively rotatable coaxial members embodying an improved one-way clutch having grippers controlled by a cage that is spaced between the relatively rotatable members.

Another object is to provide an improved unit-handling one-way clutch and bearing assembly which rotatably supports a driven member coaxially of a driving member and for transmitting only a uni-directional drive between said members.

Another object resides in the provision of an improved unit-handling one-way clutch and bearing having spaced grippers simultaneously shiftable into and out of one-way driving engagement between driving and driven members and having bearings between the grippers which maintain the driving and driven members in coaxial relation.

A still further object is to provide an improved unit-handling one-way clutch and bearing assembly of compact and economical construction wherein cage-guided grippers will simultaneously shift into and out of uni-directional driving relation between relatively rotatable members which are coaxially positioned by cage contained bearings that also space the cages in relation to the driving and driven members.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

FIGURE 1 is a fragmentary end elevation with parts in section illustrating one embodiment of the invention.

FIGURE 2 is a cross section partly in full elevation and taken along the broken line 2—2 of FIGURE 1.

FIGURE 3 is a fragmentary perspective view of one of the bearing shoes which support the clutch of FIGURES 1 and 2.

Figure 4:
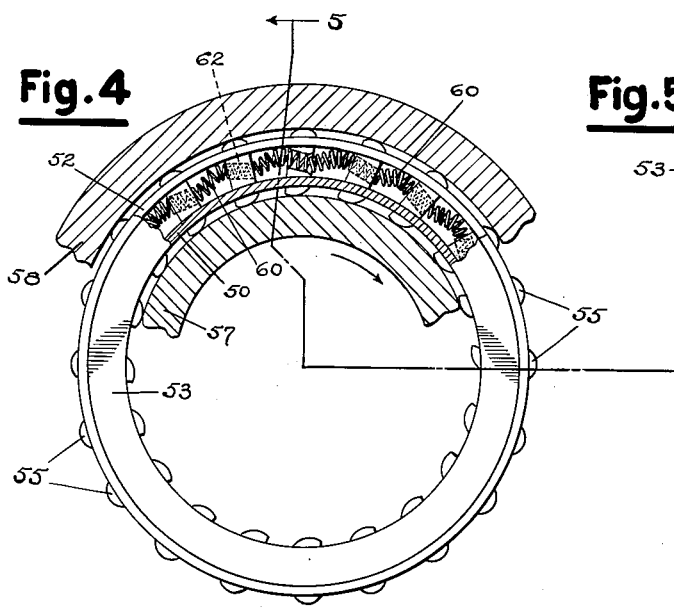
FIGURE 4 is a fragmentary end elevation with parts in section and illustrating another embodiment of my one-way clutch.

Generally considered, my unit-handling clutch assembly is arranged to transmit a one-way driving relation between a pair of relatively rotatable members as a driving race ring 10 and a driven race ring 12. This clutched driving engagement is effected through circumferentially spaced tiltable grippers or sprags, as 14, which are simultaneously tilted into wedged driving engagement with cylindrical raceway surfaces, as 15 and 16, when the inner ring 10 is rotated in a driving direction as indicated by the arrow, and which are tilted out of driving engagement with the surfaces 15 and 16 when the inner ring 10 is rotated in the opposite direction or when the outer race ring 12 overruns the inner ring 10 in the direction of driving rotation. The distance between the raceway engaging gripper faces exceeds the radial spacing between the raceways 15 and 16 so that the grippers cannot tilt into or past a dead center radial position. A pair of interfitted relatively rotatable inner and outer annular cages, as 18 and 20, have correspondingly positioned openings through which the sprags 14 slidably extend so that a tiltable movement of one sprag into or out of driving relation will result at the same time in corresponding tiltable movements of all of the other sprags into or out of simultaneous driving relation thereby distributing the operative load substantially equally between all sprags. A coiled garter spring, as 22, is slidably received through holes in the intermediate portions of the sprags and resiliently urges each of the sprags towards a clutch-engaging position. This spring 22 also locks the clutch parts together as a unit-handling assembly. The cages are supported by parts of the clutch assembly in radially spaced relation to the driving and driven members 10 and 12 to avoid the frictional drag of cages against the raceways which in prior clutches has caused objectionable wear and heating as well as often impairing the clutch operation.

In the embodiment of FIGURES 1, 2 and 3, the annular inner cage 18 has a substantially cylindrical bottom wall 24 from whose ends extend radial flanges 25 having cylindrical peripheries journalled within the cylindrical outer cage 20 which may be formed from suitable material, as sheet metal. Circumferentially spaced rectangular openings 27 in the wall 24 and correspondingly located rectangular openings 28 through the outer cage 20 receive the sprags 14 which are generally rectangular in cross section and in slidably guided engagement with the side walls of these openings. The inner and outer sprag ends have arcuate driving faces 30 and 32 which are preferably non-concentric. Bores 33 through intermediate portions of these sprags and which slidably receive the garter spring 22, are each preferably drilled at an angle slightly greater than ninety degrees to an adjacent side sprag face so that the spring 22 will be resiliently distorted to an undulating form thereby yieldably and tiltably urging each sprag towards clutch driving engagement with the raceways. However, if desired, the sprag bores 33 may be in perpendicular relation to the parallel side faces of the sprags and the spring 22 may be given an initial wave contour to resiliently urge the sprags towards wedged one-way driving engagement with the raceways 15 and 16. Since each sprag fits within and extends through openings in both inner and outer cages which are in coaxial journalled engagement, it will be appreciated that all sprags are tiltably shifted at the same time and in full phasing relation into and out of driving positions dependent upon the relative rotation of the driving and driven rings 10 and 12.

The clutch assembly also has a plurality of circumferentially spaced shoes 35 which cooperatively serve as plain bearings for supporting the rings 10 and 12 in coaxial relation and which at the same time locate the cages 18 and 20 coaxially of and radially spaced out of raceway contact. This positioning of the cages coaxially of the raceways is an important contributing factor to a uniform sprag action wherein all of the sprags simultaneously enter into and uniformly distribute the clutch driving relation between the rings 10 and 12. As illustrated, each shoe has parallel side faces 37 and has somewhat of a keystone shape wherein a short depending rectangular portion, formed by the side walls 37 and by generally radially disposed parallel end walls 38, slidably fits through a corresponding rectangular opening 40 through the cylindrical inner cage wall 24 between a pair of sprags. Notched end shoe portions provide generally radially disposed end walls 42 which in cooperation with the side walls 37 form on each shoe an outwardly extending rectangular portion slidably fitting through a generally rectangular opening 43 in the outer cage 20 between a pair of sprags. To aid stability of the shoes and provide for better race ring support, the outer cage projections which extend through the opening 43 are preferably larger than the inner cage projections which are received through the openings 40.

The bottom of each shoe 35 has a flat face 44 forming a slidable plain bearing engagement with the cylindrical inner ring surface 15, and the top of each shoe terminates in an arcuate face 45 that forms a slidable plain bearing engagement with the inner cylindrical surface 16 of the outer race ring 12. The radius of curvature of the surface 45 is preferably slightly less than that of the surface 16 thus providing a capillary angle between the shoe face 45 and the raceway 16 so that the lubricant, in which the clutch operates to reduce wear and provide free movement of parts, will easily enter between the tops of the shoes and the outer race ring surface 16 as in the manner of the well known "Kingsbury" bearing. Similarly, lubricant will enter in capillary angles formed by the tapering throats between the flat bottom shoe faces 44 and the inner raceway surface 15. However, it is to be also understood that, if desired the shoe engaging faces 44 and 45 may arcuately conform with their engaging raceways. The notched shoe portions also provide at each shoe end a shoulder 47 engageable with the inner periphery of the outer cage 20 to support this outer cage coaxially of and in radially spaced relation to both race rings 10 and 12. The inner cage 18 will also be in radially spaced coaxial relation to both race rings due to the fact that the annular flanges 25 are journalled in the outer cage. The garter spring 22, which extends through the sprags, is also slidably received in a bore 48 longitudinally through each shoe 35 and the ends of the garter spring are preferably interfitted to make this spring in effect a continuous generally annular member.

In assembly, the sprags 14 and shoes 35 are strung onto the garter spring 22, whose ends are then secured together. The sprags and shoes are fitted through the corresponding cage openings in the inner cage and radially pressed inwardly sufficiently so that the outer cage 20 can be axially slid over the flanges 25, sprags 14 and shoes 35; the sprags and shoes thereafter entering through the corresponding outer cage openings under influence of the spring 22 which thereafter secures the parts in unit-handling relation. The end walls 38 on the shoes 35 sufficiently exceed in height the end shoe walls 42 so that the shoes may be depressed beneath and within the inner periphery of the outer cage during assembly.

Figure 5:
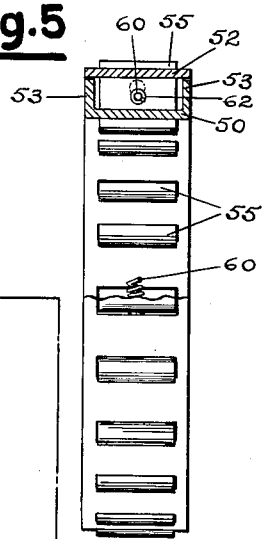
FIGURE 5 is a cross section partly in full elevation and taken along the broken line 5—5 of FIGURE 4.

In the embodiment of FIGURES 4 and 5, inner and outer annular cages 50 and 52 are in coaxially journalled relation through annular cage flanges 53 on one of the cages as the inner cage and sprags 55 extend through corresponding openings in both cages for full phasing clutching and declutching engagement with cylindrical raceways on inner and outer race rings 57 and 58 all in general accord with the corresponding parts as previously described with relation to FIGURES 1, 2 and 3. An annular garter spring 60 is slidably fitted through sprag bores 62 which are so positioned intermediate each of the sprag ends that the garter spring between the sprags rests against the inner periphery of the outer cage 52 and thereby supports this cage radially spaced from and in coaxial relation to both race rings. The inner cage through its journalled engagement with the outer cage will also locate in radially spaced relation to and coaxially of both race rings 57, 58.

Figure 6:
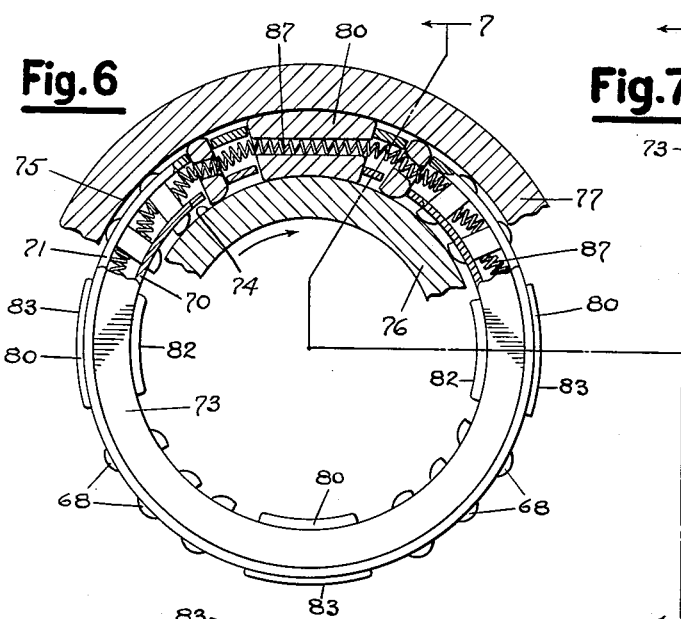
FIGURE 6 is a fragmentary end elevation with parts in section and showing another embodiment of my one-way clutch.
Figure 7:
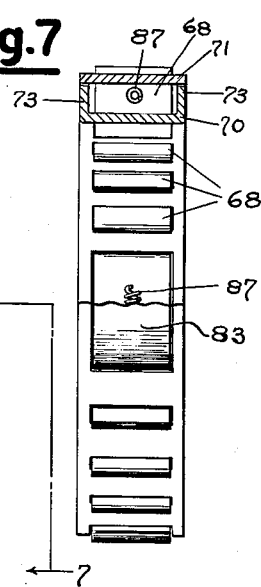
FIGURE 7 is a side elevation partly in section and taken along the broken line 7—7 of FIGURE 6.
Figure 8:
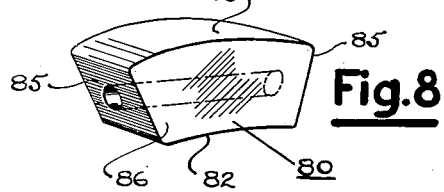
FIGURE 8 is a perspective view of one of the bearing shoes included in the embodiment of FIGURES 6 and 7.

In the embodiment of FIGURES 6, 7 and 8, circumferentially spaced sprags 68, respectively received through corresponding openings in inner and outer annular cages 70, 71, journalled in coaxial relation through annular flanges 73 on one of the cages, enter in and out of full phasing clutching and declutching engagement with cylindrical raceways 74 and 75 on inner and outer race rings 76 and 77 in general accordance with the operation of the embodiment of FIGURES 1, 2 and 3. A plurality of circumferentially spaced shoes 80, herein shown as four in number, are each provided with an inner arcuate face 82 in mating slidable engagement with the raceway 74 and provided with an outer arcuate face 83 in mating slidable engagement with the raceway 75 to provide a plain bearing support for the race rings 76 and 77 with respect to each other. Generally radial end shoe faces 85 and parallel side shoe faces 86 are slidably received through correspondingly shaped rectangular openings in both cages. A garter spring 87 similar to the garter spring 60 extends through bores in the sprags and in the shoes to hold the parts in unit-handling relation and this spring intermediate of the sprags engages and peripherally supports the outer cage to position the cages coaxially of the race rings and in radially spaced relation from both race rings in the same general manner as explained and illustrated in the embodiment of FIGURES 4 and 5.

I claim:

1. A clutch for uni-directional driving connection between relatively rotatable annular race members comprising a plurality of circumferentially spaced grippers arranged to be shifted into and out of driving connection with the race members, a pair of annular cages positioned between and in spaced relation to both race members, cylindrical walls on said cages provided with correspondingly located circumferentially spaced openings slidably receiving the grippers and through which the grippers extend, one of the cages being rotatably journalled on the cylindrical wall of said other cage to maintain said cages coaxial with each other, supports on one of the race members radially positioning one of said cages, and cage contained means extending through the grippers and which holds the grippers in assembled relation with the cages and which yieldably urges the grippers towards clutch driving positions.

2. A clutch for uni-directional driving connection between relatively rotatable annular race members comprising a plurality of circumferentially spaced tiltable grippers arranged to be shifted into and out of driving connection with the race members, a pair of annular cages received between and in spaced relation to both race members, said cages having cylindrical walls provided with correspondingly located circumferentially spaced openings slidably and matingly receiving the grippers therethrough for end driving engagement with the race members, a radially projecting annular portion on one of the cages engaging the cylindrical wall of said other cage and locating said cages in relatively rotatable coaxial relation with each other, supports on one of the race members supporting one of the cylindrical walls to locate both cages in spaced relation to the race members, and cage-contained mechanism extending through the grippers and which secures all of the clutch parts in unit-handling relation and which resiliently urges all of the grippers towards clutch driving positions.

3. A one-way clutch for driving connection between relatively rotatable inner and outer annular race members comprising a series of circumferentially spaced grippers for tiltable movement into and out of engagement with the race members, a pair of annular cages located between and radially spaced from both race members, said cages having radially spaced cylindrical walls provided with circumferentially spaced correspondingly located openings which matingly and slidably receive the grippers for end driving engagement with the race members, race engaging members radially supporting one cage in spaced relation to both race members one of said cages being journalled on the other cage for relative coaxial cage rotation to control the simultaneous tilting movement of all grippers into and out of driving engagement, and an annular resilient member extending through the grippers and between said cages which yieldably urges the grippers towards driving positions and which secures all of the clutch parts in unit-handling assembly.

4. A one-way clutch for driving connection between relatively rotatable annular race members comprising a series of circumferentially spaced grippers arranged for tiltable movement into and out of driving connection between the race members, a pair of annular cages arranged to be received between the race members and having openings that matingly receive the grippers and through which the grippers extend for end driving connection with the race members, an annular portion on one of the cages piloted on the other cage to locate both cages in relatively rotatable coaxial relation, and a resilient spring between said cages which extends through bores in the grippers tending to tilt the grippers towards clutch engaging positions and which engages one of the cages to locate both cages in spaced relation to both race members when located therebetween.

5. A one-way clutch for driving connection between relatively rotatable annular race members comprising a plurality of circumferentially spaced grippers arranged for tiltable movement into and out of driving connection between the race members, a pair of cylindrical cages between and radially spaced from both race members, said cages having radially spaced cylindrical walls provided with correspondingly spaced openings through which the grippers extend for end driving connection with the race members, spaced race-engaging members supporting one of said cages in radially spaced relation to said race members, annular portions on one cage journalled on the cylindrical wall of said other cage to locate the cages in relatively rotatable coaxial relation to each other, and a coiled spring between the cages which extends through bores in the grippers and secures the clutch parts in unit-handling relation, said coiled spring having a longitudinally undulating form which tiltably and yieldably urges the grippers towards clutch engaging positions.

6. A one-way clutch for driving connection between relatively rotatable inner and outer annular race members, a pair of annular cages arranged to be received between the race members and having correspondingly located circumferentially spaced openings, one cage having radially projecting annularly extending portions engaging the other cage to maintain the cages in relatively rotatable coaxial relation, circumferentially spaced grippers extending through some of said openings and having ends projecting beyond the cages for race member engagement, spaced bearing members slidably received in and extending through other cage openings between the grippers, said bearing members having bearing faces slidably engageable with race members to maintain the race members in relatively rotatable coaxial relation, and a spring member extending through the grippers and securing the clutch parts in unit-handling relation.

7. A one-way clutch for driving connection between inner and outer circular raceways, a pair of annular cages arranged to be located between the raceways and having openings therethrough, annular flanges on one cage journalled on the other cage and locating the cages in relatively rotatable coaxial relation, spaced grippers slidably extending through cage openings and arranged for end driving connection with both raceways, bearing shoes extending through cage openings and having bearing faces for slidable engagement with the raceways to locate said raceways in relatively rotatable coaxial relation, and said bearing faces being in slightly non-conforming relation with respect to their raceway engagement to provide capillary angles between the shoes and raceways for receiving lubricant.

8. A one-way clutch for driving connection between inner and outer relatively rotatable annular race members comprising a pair of annular cages arranged to be located between the race members and having openings therethrough, annular flanges on one of said cages slidably piloted on the other cage and providing for relative coaxial rotation of said cages, circumferentially spaced grippers slidably extending through cage openings and arranged for end driving connection with both race members, bearing shoes slidably received in cage openings and having faces outside of and beyond the cages for slidable race member engagement to support said race members for relative coaxial rotation, and spring means extending through the shoes and grippers and securing said grippers and shoes in unit-handling relation with the cages and yieldably urging the grippers towards clutch driving positions.

9. A one-way clutch for driving connection between inner and outer relatively rotatable annular race members comprising a pair of annular cages arranged to be located between the race members and having openings therethrough, radially projecting flanges on one of said cages slidably piloted on the other cage and providing for relative coaxial rotation of said cages, circumferentially spaced grippers extending through cage openings and arranged for end driving connections with both race members, bearing shoes slidably received in the cage openings, said shoes having bearing faces arranged for slidable engagement with the race members to support the race members for relative coaxial rotation, and an annularly extending spring extending between the cages and through bores in the grippers and in the shoes to hold the clutch parts in operative assembled relation as a unit, said spring also urging the grippers towards clutch engaging positions.

10. A one-way clutch for driving connection between relatively rotatable inner and outer circular raceways, a pair of annular cages arranged to be located between the raceways and having openings therethrough, annular portions on one cage piloted on the other cage and locating the cages in relatively rotatable coaxial relation, spaced grippers fitted through openings in both cages and extending beyond the cages for end driving connection with both raceways, bearing shoes slidably fitted through cage openings and radially extending beyond said cages, the shoes having bearing faces for respective slidable engagement with the raceways to locate the raceways in relatively rotatable coaxial relation, and stepped portions on the bearing shoes which engage one of the cages to locate both cages in spaced relation to both raceways when positioned therebetween, and an annular spring interlocking with all of the grippers and with said shoes.

11. A one-way clutch for driving connection between relatively rotatable inner and outer circular raceways, a pair of cage rings arranged to be received between the raceways, flanges on one cage journalled on the other cage and maintaining said cages in relatively rotatable coaxial relation, each cage having a series of circumferentially spaced through openings, circumferentially spaced grippers slidably received through pairs of corresponding cage openings and projecting beyond the cages for driving connection with both raceways, bearing shoes having radially projecting portions slidably extending through corresponding cage openings, said shoes having bearing faces for slidable engagement with the raceways to locate the raceways in relatively rotatable coaxial relation, end shoulders on each bearing shoe engageable with the outer cage for positioning both cages out of raceway engagement when the clutch is positioned therebetween, and a coiled spring extending through bores in the shoes and in the grippers and tiltably urging the grippers towards clutch driving positions.

12. A one-way clutch for driving connection between relatively rotatable inner and outer circular raceways, a pair of cage rings arranged to be received between the raceways, flanges on the ends of one cage journalled on the other cage and positioning the cages in relatively rotatable coaxial relation, each cage having a series of circumferentially spaced correspondingly located openings, grippers respectively received through pairs of corresponding openings in the cages and projecting out of the cages for driving connection with both raceways, generally keystone shaped bearing shoes in circumferentially spaced relation and having inner and outer bearing surfaces for raceway engagement to support the raceways for relative coaxial rotation, radial projections on said shoes slidably extending through correspondingly located cage openings, cage engaging shoulders on said shoes for locating the coaxial cages out of raceway engagement and coaxial with said raceways when the clutch is located therebetween, and an undulating coiled spring slidably received through bores in the shoes and in the grippers, said spring urging the grippers towards raceway engaging positions.

13. In a combined one-way sprag clutch and bearing adapted to be disposed between inner and outer races together providing inner and outer annular race surfaces; the combination comprising a plurality of circumferentially spaced sprags adapted to tilt into and out of wedging engagement with the race surfaces; a plurality of discrete, circumferentially spaced bearing members comprising first means defining a first portion on each of said bearing members contoured to conform substantially to the curvature of the inner race surface, second means defining a second portion on each of said bearing members contoured to conform substantially to the curvature of the outer race surface, rigid means on each of said bearing members spacing said first and second portions a distance equal to the desired spacing between the race surfaces, and cage means adapted to be disposed between the race surfaces including means to maintain said sprags and said bearing members in assembled relationship, said cage means comprising a pair of annular, relatively rotatable cages including means defining openings therein through which said sprags and bearing members extend; and in which said bearing members include means adapted to maintain at least one of said cages concentrically disposed with respect to the adjacent race surface.

References Cited in the file of this patent

UNITED STATES PATENTS

| | | |
|---|---|---|
| 2,399,749 | Lund | May 7, 1946 |
| 2,404,221 | Dodge | July 16, 1946 |
| 2,724,471 | Dodge | Nov. 22, 1955 |
| 2,795,308 | Hayden | June 11, 1957 |